(12) United States Patent
Petridis et al.

(10) Patent No.: US 7,814,878 B2
(45) Date of Patent: Oct. 19, 2010

(54) SYSTEM AND METHOD FOR OPERATION OF AN ENGINE HAVING MULTIPLE COMBUSTION MODES AND ADJUSTABLE BALANCE SHAFTS

(75) Inventors: Themi Philemon Petridis, Epping (GB); Harald Stoffels, Cologne (DE); Jonathan O'Neill, Erith (GB)

(73) Assignee: Ford Global Technologies, LLC, Dearborn, MI (US)

( * ) Notice: Subject to any disclaimer, the term of this patent is extended or adjusted under 35 U.S.C. 154(b) by 739 days.

(21) Appl. No.: 11/744,995

(22) Filed: May 7, 2007

(65) Prior Publication Data

US 2008/0276897 A1 Nov. 13, 2008

(51) Int. Cl.
*F02D 17/00* (2006.01)
(52) U.S. Cl. .................................... 123/192.2
(58) Field of Classification Search .............. 123/192.1, 123/192.2, 198 F; 74/603
See application file for complete search history.

(56) References Cited

U.S. PATENT DOCUMENTS

| | | | |
|---|---|---|---|
| 4,556,026 A * | 12/1985 | Masuda et al. ........... 123/198 F |
| 4,608,592 A | 8/1986 | Miyamoto | |
| 5,044,333 A | 9/1991 | Fuchigami et al. | |
| 5,327,859 A | 7/1994 | Pierik et al. | |
| 6,234,127 B1 | 5/2001 | Simpson et al. | |
| 7,377,250 B1 * | 5/2008 | Duffy ...................... 123/192.1 |
| 2004/0050363 A1 | 3/2004 | Yamaoka et al. | |

FOREIGN PATENT DOCUMENTS

| | | |
|---|---|---|
| JP | 57177441 | 11/1982 |
| JP | 60069344 | 4/1985 |
| JP | 61055431 | 3/1986 |
| JP | 62106145 | 5/1987 |

OTHER PUBLICATIONS

UK Intellectual Property Office, International Search Report of GB0807465.0, Aug. 5, 2008, UK IPO, 1 page.

* cited by examiner

*Primary Examiner*—M. McMahon
(74) *Attorney, Agent, or Firm*—Allan J. Lippa; Alleman Hall McCoy Russell & Tuttle LLP

(57) ABSTRACT

A method of operating an engine having an adjustable balance shaft may comprise adjusting operation of the balance shaft during engine operation in response to an engine combustion mode. For example, balance shafts may be disabled during SI mode and enabled during HCCI mode. Various alternative examples may also be used.

17 Claims, 6 Drawing Sheets

SYSTEM AND METHOD FOR OPERATION OF AN ENGINE HAVING MULTIPLE COMBUSTION MODES AND ADJUSTABLE BALANCE SHAFTS

BACKGROUND AND SUMMARY

An internal combustion engine for a vehicle may operate in a variety of combustion modes. One example mode is spark ignition (SI), where a spark performed by a sparking device is used to initiate combustion of an air and fuel mixture. Another example mode is homogeneous charge compression ignition (HCCI), where an air and fuel mixture achieves a temperature where autoignition occurs without requiring a spark from a sparking device. In some conditions, HCCI may have greater fuel efficiency and reduced NOx production compared to SI. However, in some conditions, such as with high or low engine loads, it may be difficult to achieve reliable HCCI combustion. Thus, depending on operating conditions, the engine may use either SI and/or HCCI combustion.

Another issue with regard to HCCI combustion is a potential for increased NVH due to a more rapid energy release rate from the faster combustion, thereby generating an increased pressure rise rate and an increased peak pressure. The higher HCCI pressure rise rate may extenuate the engine's normal Out of Balance Secondary Forces (OoBSF). OoBSF develop as the linear travel of the reciprocating piston and connecting rods transfers into crankshaft rotational movement. As a result, the piston may not follow simple harmonic motion. Rather, starting at top dead center (TDC) of piston position, the piston travels over half the bore permissible travel during the crankshaft's first 90 crank angle degrees (CAD). Then, during the next two sets of 90 CAD, the piston travels a reduced distance. Finally, during the last 90 CAD (270 to 360 degrees) the piston covers over half the remaining permissible travel once more completing the cycle. Therefore the piston speed during one complete revolution, starting at TDC, can be referred to as fast-slow-slow-fast. As the piston velocity changes, the OoBSF can affect driver feel, NVH and accelerated component wear within the engine. Thus, the higher HCCI pressure rise rate occurring during the natural piston velocity change may exaggerate the OoBSF effects. Furthermore, there may be significant change in the NVH observed into or out of HCCI mode during a mode switch.

While balance shafts may be used to address the NVH issues of HCCI combustion, use of balance shafts during SI mode may impair fuel economy and increase cylinder torque variations.

One approach to overcoming the above disadvantage may include a method of operating an engine having an adjustable balance shaft that includes adjusting operation of the balance shaft during engine operation in response to an engine combustion mode. For example, adjusting the balance shaft when switching may be used to improve the NVH differential between modes, and thus reduce driver perception of the change. As another example, adjusting the balance shaft differently for different combustion modes may be used to improve the NVH in both modes by taking into account the different combustion characteristics, and their effect on OoBSF, while also addressing fuel economy concerns. E.g., balance shaft operation may be disabled under conditions where the NVH effects are not present, such as during SI mode, thus improving fuel economy by reducing friction losses of the balance shafts.

The inventors herein have recognized the above issues and approaches. Still further issues, examples, and advantages are described herein.

DETAILED DESCRIPTION OF THE DRAWINGS

DETAILED DESCRIPTION

As described in further detail herein, a multi-mode combustion engine may be used in which adjustable balance shafts are used to provide differing operation depending on the combustion mode and/or transitions among combustion modes. Various different combustion modes may be used in the engine, including homogeneous charge compression ignition and spark ignition. However, these are simply two example combustion modes, and various others may be used, such as cylinder deactivation (e.g., no combustion), stratified combustion, lean combustion, rich combustion, and others.

Figure 1:
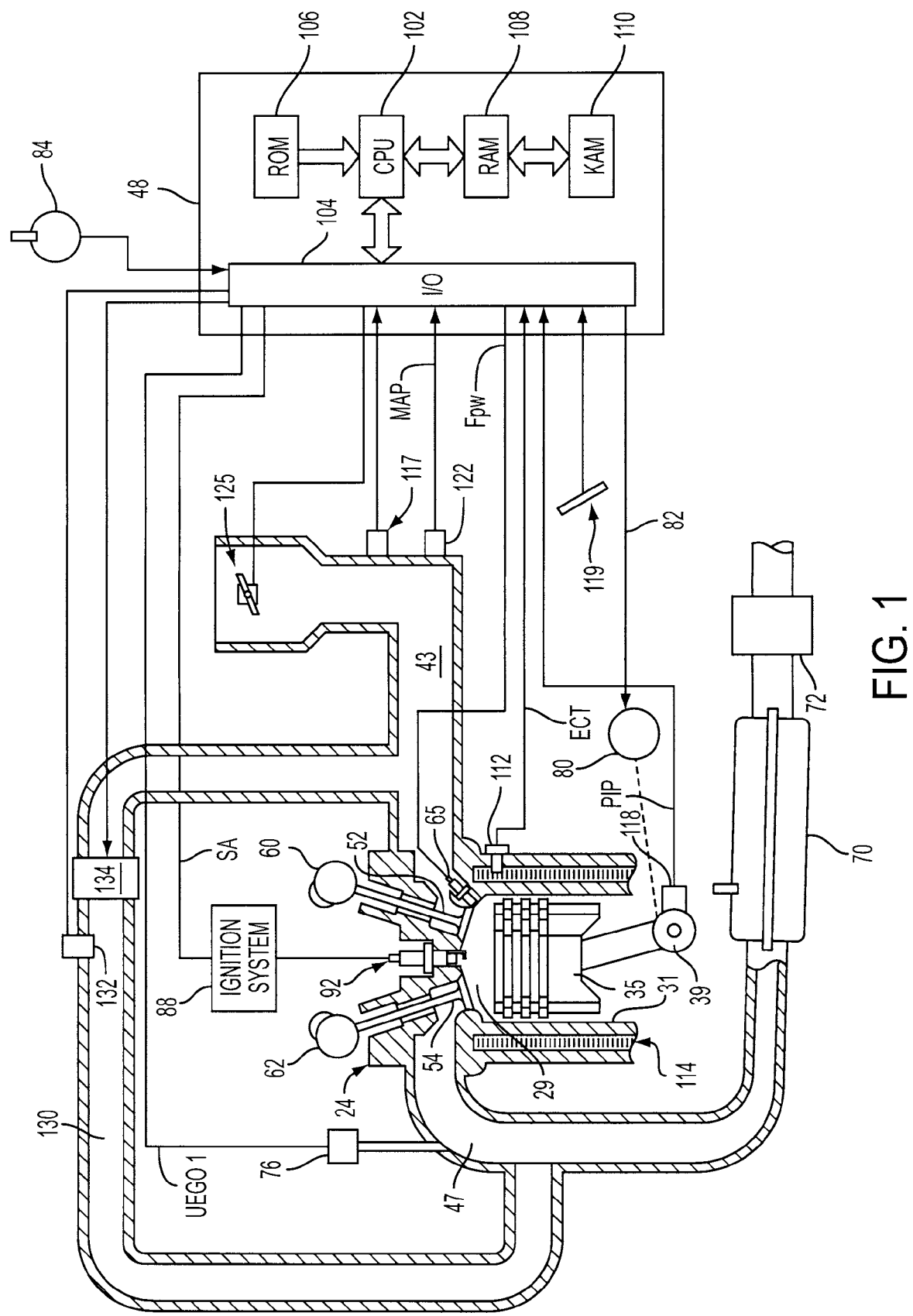
FIG. 1 is a schematic diagram of a cylinder and related systems of an example engine.

FIG. 1 shows an example engine 24. Engine 24 is shown in FIG. 1 as a direct injection gasoline engine with a spark plug; however, engine 24 may be a diesel engine without a spark plug, or other type of engine. Internal combustion engine 24 may include a plurality of cylinders, one cylinder of which is shown in FIG. 1, which is controlled by electronic engine controller 48. Engine 24 includes combustion chamber 29 and cylinder walls 31 with piston 35 positioned therein and connected to crankshaft 39. Combustion chamber 29 is shown communicating with intake manifold 43 and exhaust manifold 47 via respective intake valve 52 and exhaust valve 54. While only one intake and one exhaust valve are shown, the engine may be configured with a plurality of intake and/or exhaust valves. In addition, intake manifold 43 is shown communicating with electronic throttle 125.

Engine 24 is further shown configured with an exhaust gas recirculation (EGR) system configured to supply exhaust gas to intake manifold 43 from exhaust manifold 47 via EGR passage 130. The amount of exhaust gas supplied by the EGR system can be controlled by EGR valve 134. Further, the exhaust gas within EGR passage 130 may be monitored by an EGR sensor 132, which can be configured to measure temperature, pressure, gas concentration, etc. Under some conditions, the EGR system may be used to regulate the temperature of the air and fuel mixture within the combustion chamber, thus providing a method of controlling the timing of autoignition for HCCI combustion.

In some embodiments, as shown in FIG. 1, variable valve operation may be provided by a variable cam timing (VCT) system, variable valve lift (VVL) system, cam profile switching (CPS) system, electric valve actuation (EVA) system, and/or combinations there. Also, various types of variable valve timing may be used, such as hydraulic vane-type actuators. FIG. 1 shows an example with intake cam 60 actuating intake valve 52 and exhaust cam 62 actuating exhaust valve 54. Valve operation may also be used to regulate residuals retained in the combustion chamber, thus providing a method of controlling the timing of autoignition for HCCI combustion.

Engine 24 is also shown having fuel injector 65 coupled thereto for delivering liquid fuel in proportion to the pulse width of signal FPW from controller 48 directly to combustion chamber 29. As shown, the engine may be configured such that the fuel is injected directly into the engine cylinder, which may be referred to as direct injection. Distributorless ignition system 88 provides ignition spark to combustion chamber 29 via spark plug 92 in response to controller 48. Universal Exhaust Gas Oxygen (UEGO) sensor 76 is shown coupled to exhaust manifold 47 upstream of catalytic converter 70. Exhaust gas sensor 76 is shown coupled to exhaust manifold 48 upstream of catalytic converter 70. Exhaust gas sensor 76 may alternatively be an exhaust gas oxygen sensor (EGO), such as a heated exhaust gas oxygen sensor (HEGO). The signal from sensor 76 can be used to advantage during feedback air/fuel control to maintain average air/fuel at stoichiometry during the stoichiometric mode of operation.

Controller 48 is shown in FIG. 1 as a microcomputer including: microprocessor unit 102, input/output ports 104, and read-only memory 106, random access memory 108, keep alive memory 110, and a conventional data bus. Controller 48 is shown receiving various signals from sensors coupled to engine 24, in addition to those signals previously discussed, including: engine coolant temperature (ECT) from temperature sensor 112 coupled to cooling sleeve 114; a pedal position sensor 119 coupled to an accelerator pedal; a measurement of engine manifold pressure (MAP) from pressure sensor 122 coupled to intake manifold 43; a measurement (ACT) of engine air charge temperature or manifold temperature from temperature sensor 117; and an engine position sensor from a Hall effect sensor 118 sensing crankshaft 39 position. In some embodiments, the requested wheel output can be determined by pedal position, vehicle speed, and/or engine operating conditions, etc. Controller 48 further receives an input from driver selectable switch 84, which may be placed in a plurality of positions by a vehicle operator and indicate a driver preference for vehicle performance, such as performance tradeoffs. For example, the operator may select increased fuel economy while tolerating increased NVH, for example. Further, the driver may select a vehicle performance (e.g., torque, acceleration) mode versus a fuel economy mode. The switch may include various labels positioned to indicate different selections.

FIG. 1 shows engine 24 configured with an aftertreatment system comprising an upstream catalytic converter 70 and a downstream catalytic converter 72. The catalytic converters may be of various types, such as a three-way catalyst, a urea selective catalyst reduction device (with associated urea injection system), NOx trap, oxidation catalyst, etc.

FIG. 1 further illustrates an example balance shaft 80 shown schematically coupled to crankshaft 39 via a dashed line. Various numbers and types of balance shafts may be used depending on the engine design, number of cylinders, etc. In this example, balance shaft 80 is adjustable via a signal 82 from controller 48. Balance shaft may be used to reduce engine vibration generated by engine firing. As described in further detail herein, balance shaft may be adjusted via signal 82 depending on the engine combustion mode and based on a transition in the combustion mode. Such operation may be used to provide greater vibration reduction over an extend engine operating range and to take into account the different vibration characteristics of different engine combustion modes. In one example, balance shaft 80 may include a secondary harmonic balance beam (which may also be referred to as Lanchester Balance Beams). Further, a plurality of balance shafts may be used.

As will be described in more detail below, combustion in engine 24 can be of various types, depending on a variety of conditions. In one example, spark ignition (SI) may be used where the engine utilizes a sparking device to perform a spark so that a mixture of air and fuel combusts. In another example, homogeneous charge compression ignition (HCCI) may be used where a substantially homogeneous air and fuel mixture attains an autoignition temperature within the combustion chamber and combusts without requiring a spark from a sparking device. However, other types of combustion are possible. For example, the engine may operate in a spark assist mode, wherein a spark is used to initiate autoignition of an air and fuel mixture. In yet another example, the engine may operate in a compression ignition mode that is not necessarily homogeneous. It should be appreciated that the examples disclosed herein are non-limiting examples of the many possible combustion modes.

During SI mode, the temperature of intake air entering the combustion chamber may be near ambient air temperature and is therefore substantially lower than the temperature required for autoignition of the air and fuel mixture. Since a spark is used to initiate combustion in SI mode, control of intake air temperature may be more flexible as compared to HCCI mode. Thus, SI mode may be utilized across a broad range of operating conditions (such as higher or lower engine loads), however SI mode may produce different levels of emissions and fuel efficiency under some conditions compared to HCCI combustion.

During HCCI mode operation, the air/fuel mixture may be highly diluted by air and/or residuals (e.g. lean of stoichiometry), which results in lower combustion gas temperature. Thus, engine emissions may be substantially lower than SI combustion under some conditions. Further, fuel efficiency with autoignition of lean (or diluted) air/fuel mixture may be increased by reducing the engine pumping loss, increasing gas specific heat ratio, and by utilizing a higher compression ratio. During HCCI combustion, autoignition of the combustion chamber gas may be controlled so as to occur at a prescribed time so that a desired engine torque is produced. Since the temperature of the intake air entering the combustion chamber may be relevant to achieving the desired autoignition timing, operating in HCCI mode at high and/or low engine loads may be difficult.

Controller 48 can be configured to transition the engine between a spark ignition (SI) mode and a homogeneous charge compression ignition (HCCI) mode based on operating conditions of the engine and/or related systems. One example of a map for scheduling HCCI and SI modes is described in further detail with regard to FIG. 2.

Figure 2:
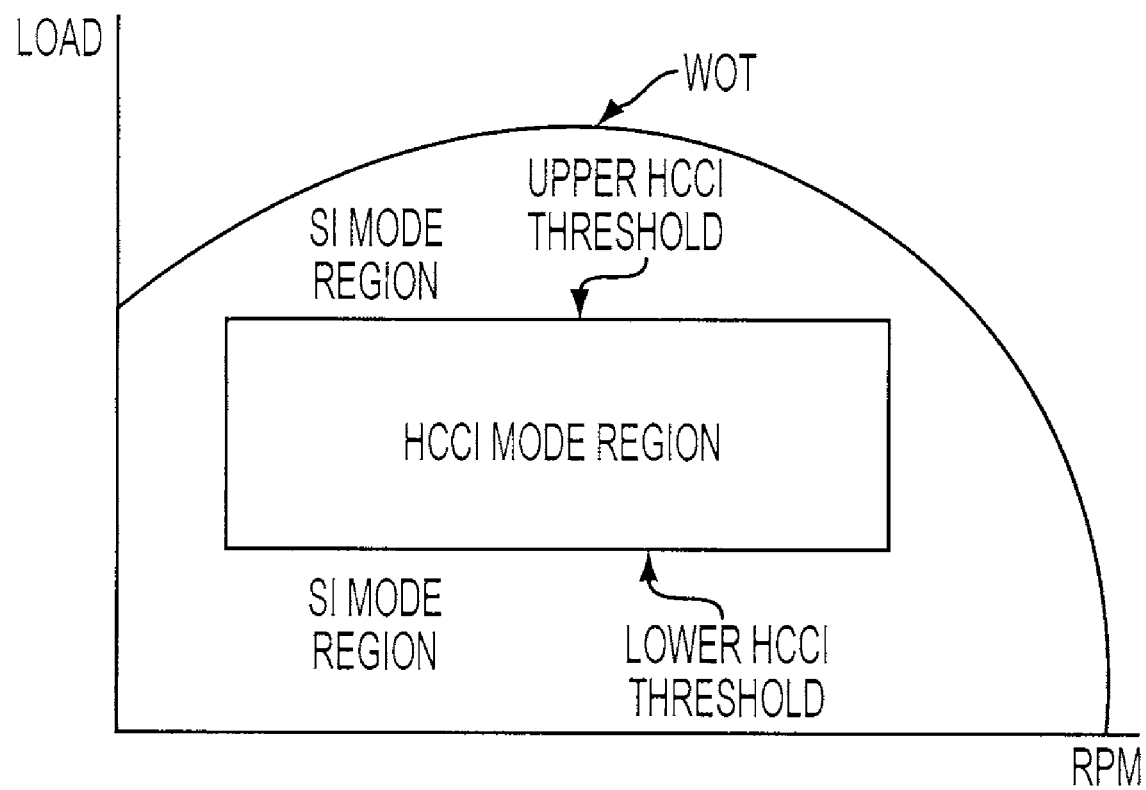
FIG. 2 is a graph showing comparison of an HCCI combustion mode region and an SI combustion mode region.

FIG. 2 shows a graph comparing the SI and HCCI combustion mode regions to wide open throttle (WOT) for an example engine. The graph of FIG. 2 shows engine speed as revolutions per minute (RPM) plotted on the horizontal axis and engine load plotted on the vertical axis. The operating region of the engine described in FIG. 2 is shown to be contained below the WOT curve. The HCCI region is shown centrally located within the engine operating region and the SI region is shown occupying the higher load regions and the lower load regions surrounding the HCCI region. Further, the HCCI region is shown bounded by an upper output threshold and a lower output threshold. It should be appreciated that FIG. 2 shows just one example of the HCCI operating region as other configurations are possible. As development of HCCI technology continues, the HCCI operating region may change as control of the HCCI process is further improved. Furthermore, it should be understood that the HCCI operating region may differ substantially depending on engine configuration and/or engine operating conditions. While only two combustion modes are shown in FIG. 2, the engine may operate with more than two combustion modes.

The operating regions described by FIG. 2 show how an engine can be configured to operate in an SI mode when the engine load is higher or lower than the HCCI region. As shown in FIG. 2, the engine may operate in an HCCI mode when the engine output is greater than the lower HCCI threshold and/or less than the upper HCCI threshold. For example, the engine load may decrease such that the engine approaches the lower limit of the HCCI region. As engine load is further decreased, the engine may transition from HCCI mode to SI mode as the engine load becomes less than the lower HCCI threshold, so that reliable combustion may be achieved. Likewise, the engine may transition from SI mode to HCCI mode as the engine load again increases above the lower HCCI threshold.

During transitions between combustion modes, engine operating conditions may be adjusted so that combustion is achieved in the desired mode with the desired characteristics.

Figure 3:
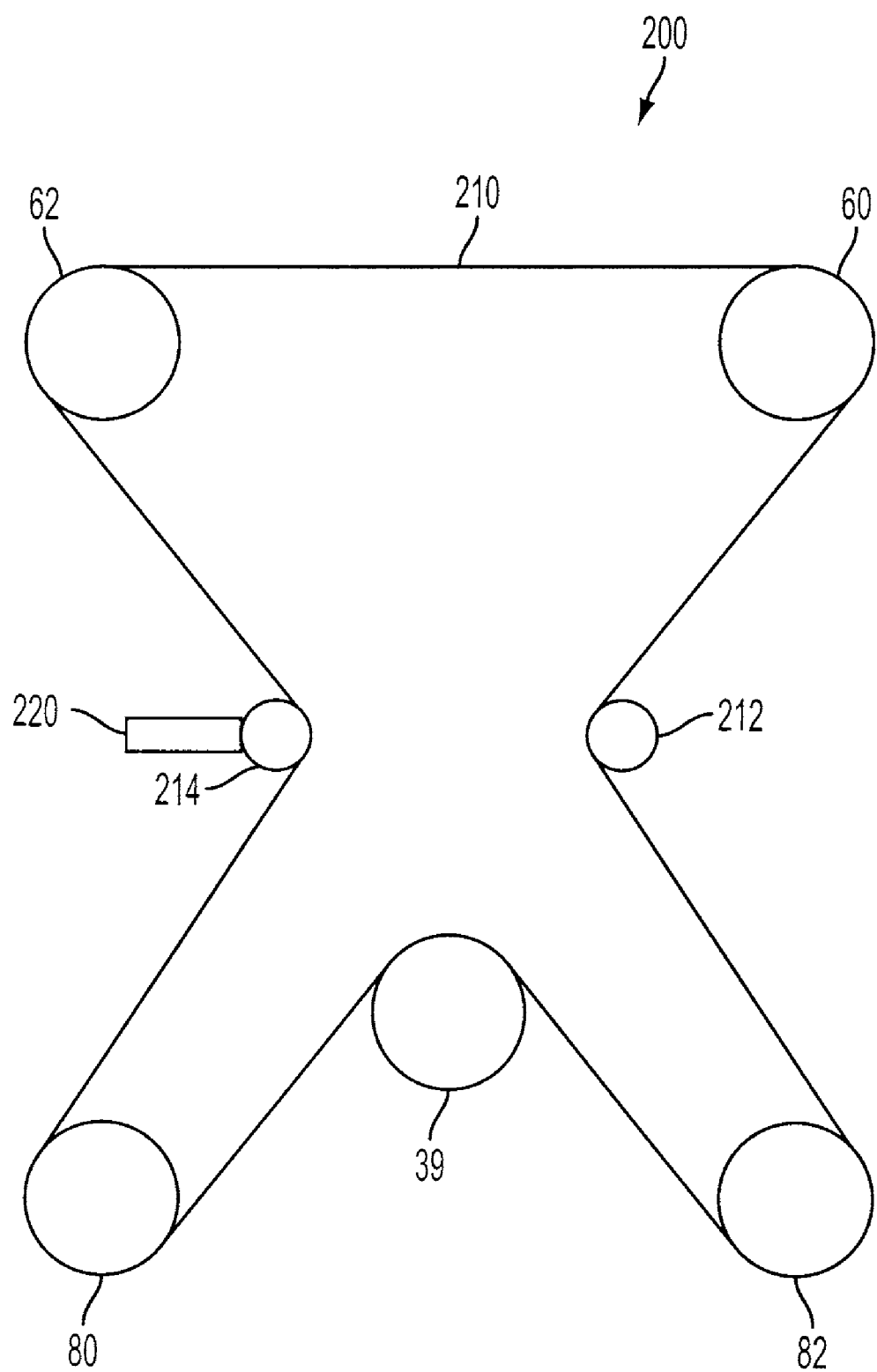
FIG. 3 is a schematic diagram of an engine and timing chain system.

FIG. 3 shows an example schematic diagram of an engine and timing chain system 200 for engine 24. Specifically, a timing chain 210 is shown coupling the intake cam 60, exhaust cam 62, idlers 212 and 214, balance shafts 80 and 82, and crankshaft 39. Further, FIG. 2 shows a tensioner 220. While this example shows a timing chain 210, a timing belt may be used as a coupling device between the crankshaft and balance shafts.

Note that the schematic diagram of FIG. 3 is not to scale, and thus the relative speeds of the different shafts and cams is not set forth in FIG. 3. Rather, in one example, where a balance shaft is situated on both sides of the crankshaft, the balance shafts may be configured to rotate at half the crankshafts speed in order for strategically placed weights to balance secondary combustion forces.

As described herein, the balance shafts may be adjustable based on a signal from a control system, such as from controller 48. In one example, the balance shafts may be engaged and disengaged during engine operation. The variable engagement may be provided by switchable pulleys, for example. Each balance shaft and associated pulley, when in operation, may be precisely timed in relation to the crankshaft (in order to effectively dampen OoBSF). As noted, each pulley may be belt or chain driven from the crankshaft pulley and rotate independently of the balance shafts when the balance shafts are disengaged. The pulleys may be actuated on demand from the controller. During this process, the internal pulley mechanism engages each balance shaft with its respective pulley ensuring that slippage has not occurred, noting the accurate phasing required between the balance shaft(s) and the crankshaft when in the standard configuration. The standard configuration may also be a suitable reference point to advance and retard the balance shaft(s) should said application be employed within the system. The weights within each balance shaft may be phased to counteract each speed/load condition with a Mass Fraction Burned rate of 50% during the HCCI combustion stroke, for example.

In another example, the balance shafts may be variably timed during engine operation. For example, pulleys (and respective balance shafts) may be capable of advancing and retarding as instructed by the controller relative to the crankshaft.

In a first embodiment, the balance shafts may be employed when one or more cylinders operate in HCCI mode and/or be disabled with one or more cylinders operating in SI mode. Further, in addition to enabling/disabling the balance shafts based on combustion mode, the enablement/disablement may alternatively or additionally be based on a transition in combustion mode of one or more cylinders. In a second embodiment, the balance shafts may be used during both SI and HCCI combustion modes, but variably timed to counteract the increased IMEP range observed in HCCI mode. Also, the timing of the balance shafts may be variably adjusted based on transitions in combustion modes of one or more cylinders. Further, in a third embodiment, combinations of balance shaft disablement/enablement and variable timing may also be used, if desired.

Referring to the first embodiment, the balance shafts may be enabled and utilized during operation with steady state HCCI combustion, and disabled during SI mode. Further, the shafts may be used during the transition phase when HCCI mode is initially performed (where the NVH difference may be most noticeable). However it should be noted that using the balance shafts permanently may degrade IMEP and fuel economy benefits normally associated with HCCI operation.

Referring to the second embodiment, the balance shafts may be used during a plurality of combustion modes, but with timing adjusted based on the mode and/or transitions between modes. For example, the balance shaft pulleys may be variably timed with a different timing in HCCI mode (to reduce HCCI high IMEP NVH) as compared to SI mode. In SI mode, it may be possible to variably time the balance shaft pulleys for NVH tuning. In one specific example, the NVH in SI operation could be briefly degraded by variably timing the balance shafts just prior to a mode switch into HCCI mode, thus contributing to a reduced NVH differential during the switch.

In addition to adjusting balance shaft timing based on combustion mode, the timing may further be adjusted within a combustion mode based on operating conditions.

For example, there may be tradeoffs between balancing the normal engine OoBSF and reducing NVH differentials during and between transitions. In one example, the control system may preferentially reduce HCCI IMEP engine OoBSF effects as their NVH effects may be greater than those encountered when changing combustion modes. In another example, advancing or retarding balance shafts during mode switching to suit initial HCCI IMEP points may be used to reduce NVH and 'driver feel' issues. Then, when an HCCI point stabilizes, if the balance shafts were previously advanced or retarded, they may be adjusted to revert to synchronize with the crankshaft and primarily reduce OoBSF.

Figure 4:
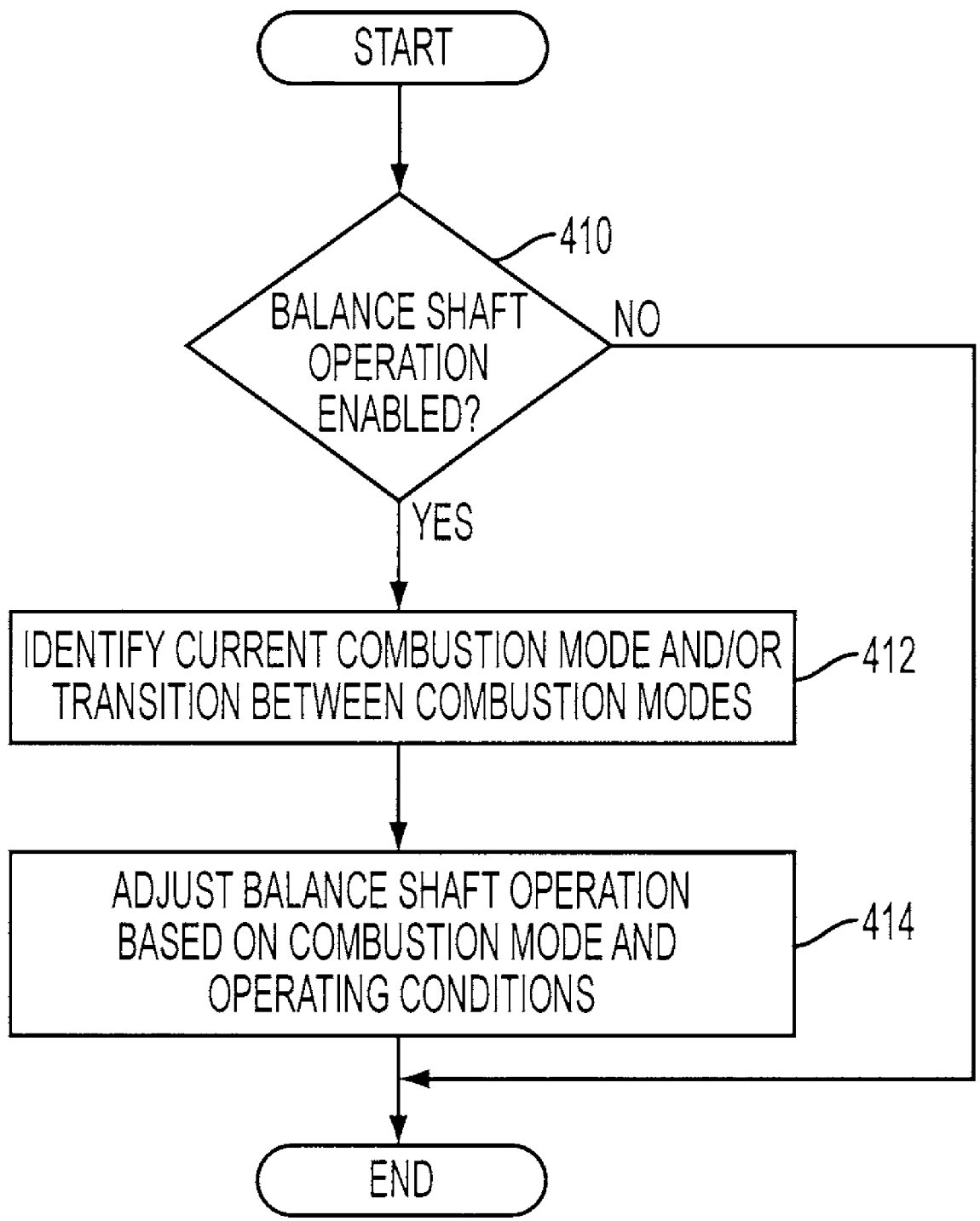
FIGS. 4-6 are flow charts showing example routines for controlling an engine system, such as the engine of FIG. 1 and/or FIG. 3.

Referring now to FIG. 4, a routine is described for adjusting balance shaft operation during engine operation based on operating conditions. The operating conditions may include an engine combustion mode, where the balance shafts may be adjusted based on the selected combustion mode, a change in combustion mode, or adjusted within a combustion mode.

First, in 410, the routine determines whether balance shaft operation, including adjustment of balance shaft operation, is enabled. The enablement may be based on a plurality of operating conditions, including engine temperature, ambient temperature, whether a selected combustion mode is enabled (such as whether HCCI mode is enabled), time since engine start, etc. If so, the routine continues to 412 to identify a current combustion mode and/or a combustion mode transition. Then, in 414, the routine adjusts balance shaft operation based on combustion mode, and may further adjust operation based on operating conditions.

For example, the routine may adjust balance shafts based on a current combustion mode, where different balance shaft operation may be used for different combustion modes. Further, the routine may adjust balance shafts before, during, or after a combustion mode transition, such as described herein. In one particular example, the routine may disable balance shafts during SI mode, and engage the balance shafts during HCCI mode. In another example, the routine may adjust balance shafts to a first timing relative to the crankshaft during HCCI mode, and to a second, different, timing relative to the crankshaft during SI mode. The timings may be more advanced in the SI mode and/or more retarded in the SI mode depending on the engine design, operating conditions, etc.

In still another example, the routine may further adjust balance shaft operation based on operating parameters, such as engine speed and/or engine load. In one example, the balance shafts may be disabled during SI mode and disabled during higher speed/load HCCI operation, yet enabled during lower speed/load HCCI operation. This example also illustrates how the balance shafts may further be adjusted based on operating conditions, e.g., the balance shafts may be adjusted within HCCI mode depending on operation such as speed/load.

Figure 5:
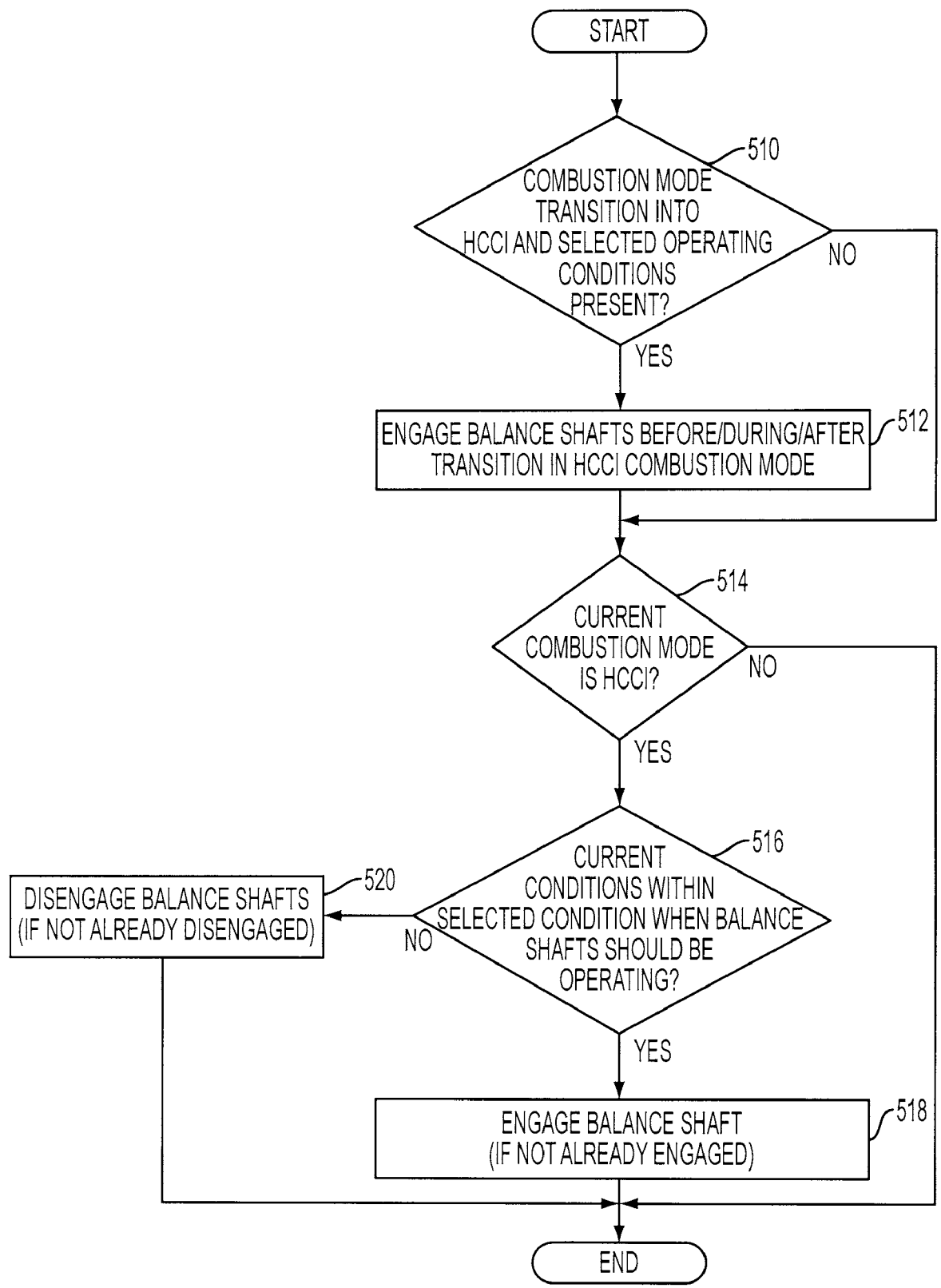

Referring now to FIG. 5, an example routine for controlling engagement/disengagement of a selectably operable balance shaft is described. First, in 510, the routine determines whether a transition into HCCI is expected and selected operating conditions are present. The selected operating conditions may include conditions in which balance shaft operation is enabled, such as engine temperature, engine speed, etc. If the answer to 510 is yes, the routine continues to 512 to engage the balance shafts before/during/after the transition from SI to HCCI mode. For example, the shafts may be engaged before the transition to reduce the NVH differential between modes, or may be engaged during the transition to mask the transition, or may be engaged after the transition. Further, under different conditions, different transition engagement points may be used. If the answer to 510 is no, the routine continues to 514.

Next, in 514, the routine determines whether the current combustion mode is HCCI mode. If so, the routine continues to 516 to determine whether the current conditions are within selected conditions where balance shafts should be engaged. For example, the routine may determine whether the engine speed/load is within a selected speed/load range (e.g., lower speed, lower load) where balance shaft operation is desired to reduce NVH of HCCI combustion. If so, the routine continues to 518 to engage the balance shafts (if not already engaged). Otherwise, the routine continues to 520 to disengage the balance shafts (if not already disengaged).

As noted herein, the routine may be repeatedly performed at predetermined or variable execution intervals.

Figure 6:
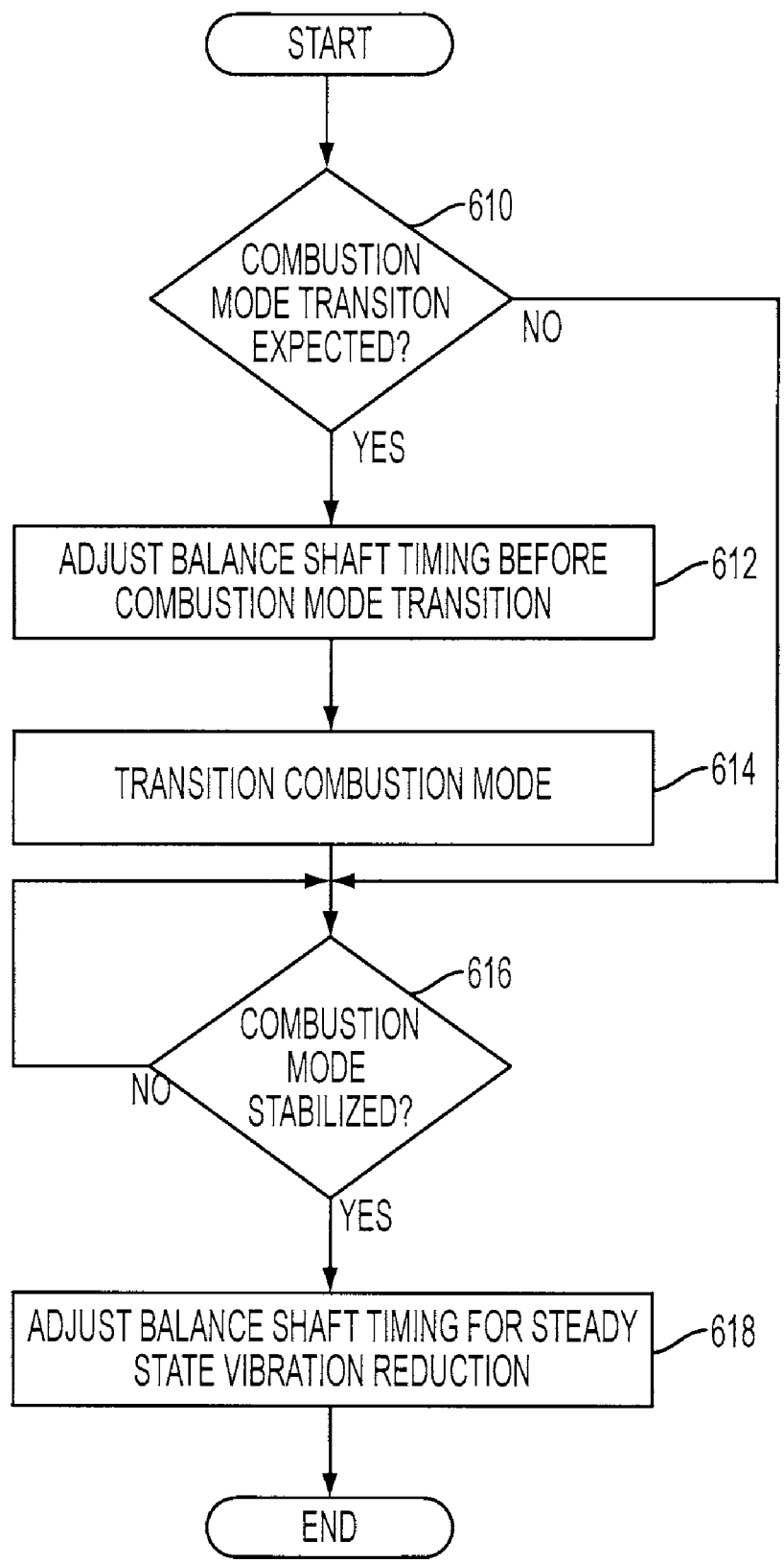

Referring now to FIG. 6, an example routine for controlling advance/retard of a variably timed balance shaft is described. First, in 610, the routine determines whether a combustion mode transition is expected. If so, the routine adjusts the balance shaft timing in 612 before the combustion mode transition to reduce the NVH differential between combustion modes. Then, in 614, the routine transitions the combustion mode, and may further adjust the balance shaft timing in synchronism with the transition. Then, in 616, the routine determines whether the combustion mode has stabilized (e.g., whether the combustion timing has stabilized, engine speed has stabilized, etc.). If not, the routine returns to again monitor the combustion in 616. Otherwise, the routine continues to 618 to adjust the balance shaft timing for steady state vibration reduction based on the current combustion mode. For example, different timing (e.g., advance and/or retard) may be used for SI mode as compared with HCCI mode. Additionally, under some conditions, the same timing between modes may be used, such as a specific speed region.

In one example, a combustion sensor may be coupled to engine 10 and used to monitor combustion. The sensor may include and ion current sensor, cylinder pressure sensor, and/or one or more knock sensors. The combustion sensor may further be used as a feedback signal for balance shaft operation and timing adjustment. Further still, the sensor may be used for closed loop combustion phasing control in HCCI to adjust fuel injection amounts, fuel injection timing, cylinder temperature, etc. In this way, the sensor provides information used for multiple facets of engine control.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine having an adjustable balance shaft, comprising:
adjusting operation of the balance shaft during engine operation in response to an engine combustion mode, wherein balance shaft timing is adjusted relative to engine crankshaft timing.

2. The method of claim 1, wherein the adjusting includes operating with the balance shaft in a first condition during a first cylinder combustion mode, and operating with the balance shaft in a second, different, condition during a second cylinder combustion mode.

3. The method of claim 1, wherein the adjusting includes adjusting the balance shaft in response to a transition in a cylinder combustion mode from a first cylinder combustion mode to a second cylinder combustion mode.

4. The method of claim 1 further comprising adjusting operation of the balance shaft during engine operation within a first combustion mode.

5. The method of claim 3, where the adjusting is performed before said transition.

6. The method of claim 3, where the adjusting is performed during said transition.

7. The method of claim 1 wherein the balance shaft is decoupled from the crankshaft.

8. The method of claim 1 wherein the balance shaft timing is advanced and retarded relative to engine crankshaft timing in response to the combustion mode.

9. The method of claim 1, further comprising transitioning at least one cylinder from homogeneous charge compression ignition mode to spark ignition mode, and adjusting operation of the balance shaft during engine operation in response to said transition.

10. A system for an engine having a crankshaft, comprising:
an adjustable balance shaft;
a coupling device coupling the balance shaft and the crankshaft so that the balance shaft and the crankshaft rotate in relative proportion to one another;

a control system coupled to the engine and said balance shaft, the control system adjusting operation of said balance shaft during engine operation in response to an engine combustion mode, wherein balance shaft timing is adjusted relative to engine crankshaft timing.

11. The system of claim 10, wherein the adjusting includes operating with the balance shaft in a first condition during a first cylinder combustion mode, and operating with the balance shaft in a second, different, condition during a second cylinder combustion mode.

12. The system of claim 10, wherein the adjusting includes adjusting the balance shaft in response to a transition in a cylinder combustion mode from a first cylinder combustion mode to a second cylinder combustion mode.

13. The system of claim 10 wherein the control system further adjusts operation of the balance shaft during engine operation within a first engine combustion mode.

14. The system of claim 10 wherein the balance shaft is decoupled from the crankshaft.

15. The system of claim 10, wherein the control system further transitions at least one cylinder from homogeneous charge compression ignition mode to spark ignition mode or vice versa, and adjusts operation of the balance shaft during engine operation in response to said transition.

16. The system of claim 14 further comprising a switchable pulley.

17. A method of operating an engine having an adjustable balance shaft, comprising:
    switching a cylinder combustion mode between spark ignition and homogeneous compression ignition; and
    adjusting operation of the balance shaft during engine operation in response to an engine combustion mode.

\* \* \* \* \*